US009660790B2

(12) United States Patent
Lamy-Bergot et al.

(10) Patent No.: US 9,660,790 B2
(45) Date of Patent: May 23, 2017

(54) METHOD FOR MANAGING HF FREQUENCIES IN BROADBAND USE

(71) Applicant: THALES, Neuilly-sur-Seine (FR)

(72) Inventors: Catherine Lamy-Bergot, Gennevilliers (FR); Jean-Luc Rogier, Gennevilliers (FR)

(73) Assignee: Thales, Courbevoie (FR)

( * ) Notice: Subject to any disclaimer, the term of this patent is extended or adjusted under 35 U.S.C. 154(b) by 310 days.

(21) Appl. No.: 14/339,389

(22) Filed: Jul. 23, 2014

(65) Prior Publication Data

US 2015/0029960 A1    Jan. 29, 2015

(30) Foreign Application Priority Data

Jul. 25, 2013   (FR) ...................... 13 01792

(51) Int. Cl.
*H04W 4/00*  (2009.01)
*H04L 5/00*  (2006.01)
*H04W 16/14*  (2009.01)
*H04L 27/00*  (2006.01)

(52) U.S. Cl.
CPC .......... *H04L 5/0064* (2013.01); *H04L 5/0037* (2013.01); *H04L 5/0066* (2013.01); *H04L 27/0006* (2013.01); *H04W 16/14* (2013.01)

(58) Field of Classification Search
CPC ............. H04W 72/0453; H04L 5/0037; H04L 5/0066; H04L 27/0006
USPC ....................................................... 370/329
See application file for complete search history.

(56) References Cited

U.S. PATENT DOCUMENTS

| 2002/0188668 | A1* | 12/2002 | Jeffery | H04L 12/2874 709/203 |
| 2004/0057188 | A1* | 3/2004 | Phillips | H04M 3/18 361/119 |
| 2005/0002669 | A1* | 1/2005 | Adleman | H04B 10/079 398/58 |
| 2007/0121576 | A1* | 5/2007 | Stein | H04Q 11/04 370/351 |

(Continued)

FOREIGN PATENT DOCUMENTS

| EP | 2458770 A1 | 5/2012 |
| WO | 2013053703 A1 | 4/2013 |

*Primary Examiner* — Faisal Choudhury
(74) *Attorney, Agent, or Firm* — Baker & Hostetler LLP

(57) ABSTRACT

A method for managing the HF frequencies in a broadband communication network, comprises the following steps: determining the range of passing frequencies for a user for a given link and SLA service; establishing the set of authorized frequencies S" in the transmission range of the user with the different power and modulation configurations for each frequency; analyzing the received spectrum in order to determine the frequency or frequencies already used and deciding, on the basis of their associated usage type, whether they must be excluded; for each possible frequency fl of the set S''', determining the necessary power $\tilde{P}$, $i=1 \ldots N$, $j= 1 \ldots m$ for each of the m possible rate/waveform configurations, taking into account the power limit on each frequency fl; allocating the frequencies fl of the set S''' to the different users, their modulation and their power, by taking account of multi-carrier constraints.

11 Claims, 2 Drawing Sheets

(56) References Cited

U.S. PATENT DOCUMENTS

| | | | |
|---|---|---|---|
| 2008/0311848 A1* | 12/2008 | Proctor, Jr. | H04B 7/15542 455/9 |
| 2010/0110195 A1* | 5/2010 | Mcintosh | H04N 7/17309 348/157 |
| 2011/0128999 A1* | 6/2011 | Ruegamer | G01S 19/13 375/147 |
| 2011/0176622 A1* | 7/2011 | Higashinaka | H04J 11/0033 375/259 |
| 2012/0188919 A1* | 7/2012 | Subasic | H04B 7/15578 370/279 |
| 2012/0309330 A1 | 12/2012 | Lamy-Bergot | |
| 2013/0201316 A1* | 8/2013 | Binder | H04L 67/12 348/77 |

* cited by examiner

METHOD FOR MANAGING HF FREQUENCIES IN BROADBAND USE

CROSS-REFERENCE TO RELATED APPLICATION

This application claims priority to foreign French patent application No. FR 1301792, filed on Jul. 25, 2013, the disclosure of which is incorporated by reference in its entirety.

FIELD OF THE INVENTION

The invention relates to a method for dynamic frequency allocation management in a broadband context which requires more frequency than in a narrowband context, for example. The method is used notably for fourth-generation (4G) high-frequency transmissions, HF, notably for the following uses: multi-carrier waveforms, in the presence or absence of single-channel transmissions, shared management of the frequencies between different users and services, channel allocation with different powers.

BACKGROUND

HF links offer a beyond-the-horizon or BLOS (Beyond Line of Sight) capability which enables the implementation of long-distance or very long-distance communications without the need to use a satellite or relay stations. Frequency management enables the frequency or frequencies used for a given service to be chosen allowing the service concerned to be provided, while maintaining an availability of the other services and by adhering to the regulatory allocations, notably concerning maximum power and the radio pattern radiated outside the useful band. The prior art in the field of HF band frequency management corresponds to the mechanisms known as Automatic Link Establishment (ALE) and Automatic Link Maintenance (ALM). In the more general field of cognitive radio, there are finer and continuously applied frequency management mechanisms for selecting a range of frequencies or frequencies on the basis notably of the link budget and/or occupancy of the channels by other users.

According to a first approach, the prior art is essentially based on a static allocation of a frequency plan comprising all frequencies and drawn up during the task preparation, and second-generation or third-generation ALE protocols implemented during the link establishment. The conventional ALE protocol consists in searching for a passing frequency, by sequentially testing the different frequencies of the plan. According to the mode used, the selected frequency may be the first frequency meeting the link criteria, or the "best" frequency, i.e. the frequency which optimises the criterion in question for the frequency plan concerned. During the communication, link management protocol may need to modify the parameters of said link, including by again initiating a search for a suitable frequency, for example via an ALM mechanism. The conventional 2G or 3G allocation and corresponding link maintenance solution, "first come, first served", does not allow any variable rights/priorities according to the service concerned to be taken into account.

According to a second approach, concerning the particular case of waveforms using a plurality of non-adjacent channels, it is possible to modify the choice of the frequencies during a communication, insofar as the same communications band is used, for example according to a principal described in the patent application of the applicant WO 2013/053703. These different solutions for creating and then managing the link are based on frequency allocations which are static, at least in the short term, and locally exclusive between the different networks. They enable the co-existence of the different transmission modes (single-channel, multi-channel) and also different services, such as telephony, telegraphy, e-mail, the Internet, file transfer, etc. Even if the possibility remains of making these frequency plans dependent on the time or season in order to adapt to the propagation conditions at a given moment, the allocation remains static and locally exclusive, which has the disadvantage of requiring a large number of frequencies overall. The broadband link management solution during a communication does not resolve the "first come, first served" problem. It does not allow different authorised maximum power levels to be managed according to the frequencies.

Moreover, according to a third approach, it is possible to compare towards the "cognitive radio" techniques which develop frequency-sharing principles in order in order to provide a solution to the problem of lack of frequencies. These principles are based on a frequency classification specific to the user and/or the service concerned. In the particular case of HF, three user cases can notably be distinguished: the exclusive primary user, the non-exclusive primary user and the secondary user. A secondary user is obliged not to use the frequency if it is being used by a primary user, and to release it if a primary user seeks to use it. However, the cognitive radio solution with frequency sharing between a plurality of users does not allow variable power levels to be specifically managed according to the frequencies. This solution assumes that it is possible to detect and identify other users and their type, and therefore to have access to their signalling, even though HF band communications are generally encrypted and more less protected.

The solutions offered by the prior art notably have severe limitations. They do not allow a set of allocations comprising a plurality of power levels, notably in the case of multi-channel transmissions, to be taken into account. A second difficulty appears when a frequency-sharing principle is to be combined with a joint management of single-channel and multi-channel transmissions. The basic principle of frequency sharing consists in allocating a set of services SLA (Service Level Agreement) to each channel with the allocation of certain characteristics for each SLA: power, primary or secondary usage type.

The choice of a set of channels for the implementation of a multi-channel transmission furthermore requires observance of certain constraints applying not only to the individual channels but also to the group of selected channels: maximum bandwidth, total transmit power, spectral transmission pattern. The prior art consists in combining a priori the channels meeting these constraints, which has the effect of dedicating them to the multi-channel waveform, and which goes against the frequency-sharing principle.

Existing solutions do not allow account to be taken easily of the fact of having to manage channels with different power levels while guaranteeing adherence to the associated patterns. Furthermore, existing solutions do not therefore allow the frequency allocator to supply sets of frequencies clearly larger than the sets of frequencies required for the current communication modes, where the allocations of the high-power frequencies are subject to international regulation and sharing at a worldwide level due to the very long-distance character of the HF propagation in ionospheric mode, since adherence to the limited powers cannot easily be guaranteed.

Each frequency has a certain number of authorised services or SLAs, a maximum authorised power level $P_{max}$ for each SLA service and associated usage type; exclusive primary, non-exclusive primary and secondary.

SUMMARY OF THE INVENTION

The method according to the invention is based notably on the use of a model which exploits notably the perception of the noise and the received power in the channel concerned. The method will consider the constraints initially for each of the carriers, and will then use an overall optimisation criterion. The constraints having to be satisfied by multi-channel transmission are expressed as maximum bandwidth, power, adherence to the transmission pattern resulting from the frequency multiplex.

The invention relates to a method for dynamic HF frequency allocation management in a broadband communication network containing a plurality of users, a set of frequencies $S=\{fi\}_{i=1,N0}$ being allocated to each user, one frequency having one or more authorised SLA services, a maximum power level $P_{max}$ for each SLA service and an associated usage type, characterized in that it comprises at least the following steps:
- determining the range of passing frequencies for the user for a given link and SLA service, set S',
- establishing the set of authorised frequencies S" in the transmission range of the user with the different power and modulation configurations for each frequency, comprising the intersection between the set S and the range of passing frequencies S',
- analysing the received spectrum in order to determine the frequency or frequencies already used and deciding, on the basis of their associated usage type, whether they must be excluded in order to form a set S'" of N possible frequencies fl,
- for each frequency fl of the set S'", determining the necessary power $\tilde{P}_i^j$, i=1 ... N, j=1 ... m for each of the m possible rate/waveform configurations, taking into account the power limit on each frequency fl,
- allocating the frequencies fl of the set S'" to the different users, their modulation and their power by taking account of multi-carrier constraints such as the maximum total band, total power, conformity of the transmitted spectrum resulting from the simultaneous use of the frequencies fl with the authorised power frequency pattern.

According to one embodiment, for a user and a service SLA concerned, the list of m rate/waveform configurations conceivable for the service SLA is determined during the operation of the method.

According to another embodiment, the necessary power $\tilde{P}_i^j$, i=1 ... N, j=1 ... m is determined by applying the following rule:

if $\tilde{P}_i^j > P_{tot}$ then $P_i^j = P_{tot} + 1$ if $\tilde{P}_i^j \leq P_{tot}$ then $P_i^j = \tilde{P}_i^j$ According to one alternative embodiment, a rate/power cost function is used to determine the frequency configuration.

A cost function $$\varsigma = \frac{\text{rate}}{\text{power}},$$

for example, and the costs $$\varsigma_i^j = \frac{d^j - d^{j-1}}{P_i^j - P_i^{j-1}}$$

are defined and the different increments are arranged in ascending order.

According to one alternative embodiment of the method, the step of resolution under frequency allocation constraints is carried out according to the required criterion and by using one of the following criteria:
determining a target rate D using a minimum overall power $$\min \sum_{i=1}^{N} \sum_{j=1}^{m} x_i^j P_i^j \left| \sum_{i=1}^{N} \sum_{j=1}^{m} x_i^j d^j \geq D \right.$$

determining a maximum rate under the constraint of a total overall transmit power level $$P_{tot} \max \sum_{i=1}^{N} \sum_{j=1}^{m} x_i^j d^j \left| \sum_{i=1}^{N} \sum_{j=1}^{m} x_i^j P_i^j < P_{tot}, \right.$$

where n is the maximum number of 3 kHz channels concerned.

It is also possible to use an integrity constraint in the choice of frequency modulation, represented by the integral variable $x_i^j$:

$$\forall i = 1 \cdots N, j = 1 \cdots m x_i^j \in \mathbb{N}$$

$$\forall i = 1 \cdots N, \sum_{j=1}^{m} x_i^j \leq 1$$

$$\sum_{i=1}^{N} \sum_{j=1}^{m} x_i^j \leq n$$

The integral variable may be equal to 1 when the frequency $f_i$ is used with the $j^{th}$ rate $d^j$.

The invention also relates to a system for dynamic HF frequency allocation management in a broadband communication network including a plurality of users, a set of frequencies $S=\{fi\}_{i=1,N0}$ being allocated to each user, one frequency having one or more authorised services SLA, a maximum power level $P_{max}$ for each service SLA and an associated usage type, characterized in that each user comprises at least transmit/receive means, a communication module, a processor adapted for carrying out the aforementioned steps of the method, and a frequency plan storage memory for a service SLA.

The method and the system according to the invention can be used for fourth-generation or 4G high-frequency transmissions.

BRIEF DESCRIPTION OF THE DRAWINGS

Other characteristics and advantages of the present invention will be more evident from a reading of the description of one or more embodiments, wherein.

DETAILED DESCRIPTION

The method according to the invention is based notably on the implementation of a model enabling evaluation of the rate that can be attained for a transmit power $P_i$ and a given modulation $M_j$ for each transmit channel $C_k$. The model takes account notably of the perception of the noise and the received power on the channel concerned. The method notably determines a frequency usage solution which respects the allocations carried out.

The assumptions for carrying out the method according to the invention are as follows: a set S of $N_0$ frequencies is allocated to the user by a frequency allocation device.

$$S = \{f_i\}_{i=1 \ldots N_0} \mid \forall\, i = 1 \cdots N_0 f_i : \begin{cases} \text{authorised } SLAs \\ P_i^{max}(SLA) \\ \text{usage type} \end{cases}$$

The set S of frequencies is filtered frequency-by-frequency, in a first step according to different criteria, such as the SLA, the quality of the communication channel associated with the frequency and evaluated a priori, and the authorised power. From the subset S' of the frequencies resulting from this filtering step, the usable frequencies are determined taking account of the perception of the transmission environment, and taking account of the system performance modelling, the relationship between the power, modulation and rate parameters. At the end of this second step, the set of eligible frequencies S", with their different power and modulation configurations, is determined. The best frequency configuration, with the associated parameters (power, modulation) for each frequency, is then chosen in such a way as to observe the constraints relating to the adopted multiplex (total frequency band used, total transmitted power, resulting spectral pattern), to ensure the required SLA, and to optimise the required criterion (for example total rate/power).

It will be possible to allocate a large number of frequencies with a low power level, for example 20 W, even though it may not be authorised to use them for narrowband services. It will be possible to allocate one or more frequencies with a higher power level, 125 W, 400 W or even 1 kW, in such a way as offer a customary capacity notably in narrowband single-channel mode.

According to one particular embodiment, there will be, for example, a service SLA for the link establishments (ALE) which could enable separation of the frequencies dedicated to narrowband ALE and others for the communication.

The example that will be given by way of illustration relates to the case of a single SLA, since it is possible to define specific SLAs as required according to the simultaneous use of a plurality of different SLA services.

Figure 1:
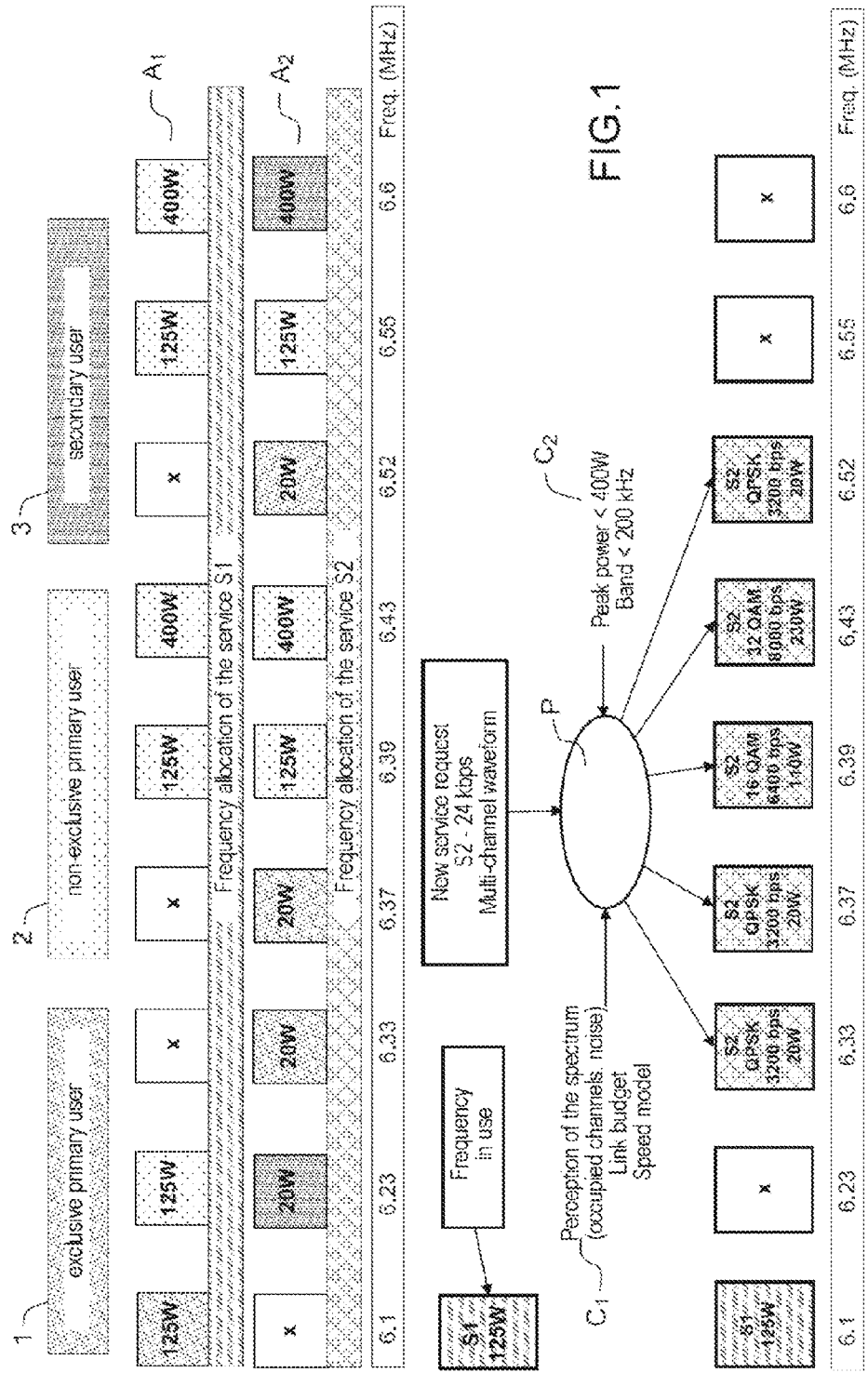
FIG. 1 shows an illustration of the frequency allocation for a given user and service.

FIG. 1 shows an example of frequency allocation for different users, exclusive primary user, 1, non-exclusive primary user, 2, and secondary user 3. The method according to the invention is shown via the dynamic frequency allocation process P, under constraints $C_1$ such as the perception of the spectrum, the link budget, etc., and under constraints $C_2$, for example the peak power and the band. The line $A_1$ corresponds to an example of the frequency allocation of a first service $A_1$, and the line $A_2$ corresponds to an example of the frequency allocation of the service $A_2$.

Figure 2:
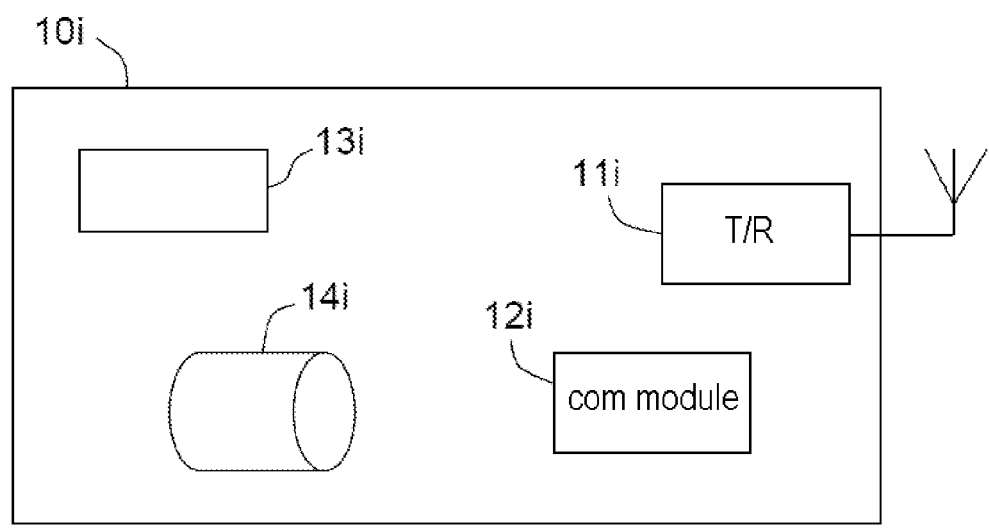
FIG. 2 shows an architecture of a user terminal.

FIG. 2 shows schematically an example of a system including a plurality of users 10i, each user comprising transmit/receive means 11i, a communication module 12i, a processor 13i adapted for carrying out the steps of the method according to the invention, and a frequency plan storage memory 14i for a service SLA. The steps of the method are carried out in a user terminal which will itself manage the frequencies that it needs, doing so when users are working in distinct sub-bands. If a plurality of user terminals share one sub-band, it is possible to define the user terminal that initiated the link as the system master. The steps of the method according to the invention will be described in this latter context using an illustrative and non-limiting example.

Start-Up of the Algorithm Run in a User Terminal:

The user wishes to initiate a communication according to the service (SLA). The maximum usable power is $P_{tot}$.

Step 1, Offline Filtering

This first step comprises all of the calculations that can be made without knowledge of the specific propagation conditions concerned.

1-A: the processor selects frequencies authorised for the SLA concerned from S, giving S', the set of authorised frequencies.

1-B: it then draws up a list of the waveforms conceivable for the service concerned SLA and the relevant rates (and the range of associated target signal-to-noise ratio SNR values) in an equivalent 3 kHz channel, for example.

This calculation can be carried out for each useful band range. For simplicity, it is then proposed to consider the case where an n*3 kHz extrapolation is performed, including for the use of a single-carrier waveform with a width >3 kHz, where n is an integer.

Step 2, Online Filtering

This step comprises all of the calculations carried out taking account of the specific propagation conditions concerned.

2-A: the process analyses the range of selected frequencies (for example after a link establishment phase ALE, or because it involves the last range of frequencies used). If the range does not allow the required service to be attained (e.g. there are not enough frequencies for a high-rate service HD), a link establishment (or ALM) is again initiated, returning to a case where a service is potentially possible.

2-B: S' is then filtered to obtain S", the set of authorised frequencies in the transmission range of the user with the different power and modulation configurations for each frequency, comprising the intersection between the set S and the range of passing frequencies S'.

In the case of an XL transmission, such as that described in patent EP 2458770 of the Applicant, the transmission range may have a width of 200 kHz.

2-C: the received spectrum is analysed in order to determine the frequencies already occupied and to decide, on the basis of their associated usage type, whether they must be excluded in order to form a set of possible frequencies. The perceived noise level, for example, is measured by a method known to the person skilled in the art and, being broadband, it is assumed that the lowest perceived noise level is the noise floor. For each frequency fi in S", the noise level is measured and the value obtained is compared with a floor noise value evaluated according to a principle known in the field of broadband communication.

This enables exclusion from the plan concerned of the frequencies possibly already occupied on which it is not possible to transmit (level perceived as clearly above the noise floor), due to their associated usage type. It is assumed that S''' is the set of authorised frequencies resulting from this separation.

2-D: with the signal-to-noise ratio SNR values attainable for each frequency of the necessary power $\tilde{P}_i^j$, i=1 ... N, j=1 ... m is determined for each frequency for each of the m rate/waveform configurations selected in step 1-B.

For every configuration m, the necessary associated power level is determined for the N frequencies fl in taking account of the power limit on each fi:

if $\tilde{P}_i^j > P_{tot}$ then $P_i^j = P_{tot} + 1$ if $\tilde{P}_i^j \leq P_{tot}$ then $P_i^j = \tilde{P}_i^j$ 2-E: Resolution under frequency allocation constraints according to the required criterion.

A plurality of cases are notably conceivable, for example:

Determining a target rate D using a minimum overall power. The criterion will then be $$\min \sum_{i=1}^{N} \sum_{j=1}^{m} x_i^j P_i^j \;\Bigg|\; \sum_{i=1}^{N} \sum_{j=1}^{m} x_i^j d^j \geq D$$

where $x_i^j$ is an integrity constraint detailed below,

Determining a maximum rate under the constraint of a total overall transmit power level $P_{tot}$ (e.g. power of the transmitter concerned). The criterion will then be $$\max \sum_{i=1}^{N} \sum_{j=1}^{m} x_i^j d^j \;\Bigg|\; \sum_{i=1}^{N} \sum_{j=1}^{m} x_i^j P_i^j < P_{tot},$$

where n is the maximum number of 3 kHz channels concerned.

In the example given, $P_{tot}$ denotes the peak or mean power. Different solutions can be refined, a plurality of Output Back-Off (OBO) factors being able to be used according to the use or otherwise of clipping, the values of n, the modulation type. By default, in XL mode, it is recommended to apply a clipping with a value of 6 to 8 dB and to work in relation to a mean useful power.

In all cases, these equations are written with an integrity constraint of the frequency modulation choice, represented by the integral variable (equal to 1 when the frequency $f_i$ is used with the $j^{th}$ speed $d^j$):

$$\forall i = 1 \cdots N, j = 1 \cdots m \; x_i^j \in \mathbb{N}$$

$$\forall i = 1 \cdots N, \sum_{j=1}^{m} x_i^j \leq 1$$

$$\sum_{i=1}^{N} \sum_{j=1}^{m} x_i^j \leq n$$

2-F: a filtering is added on the conformity of the transmitted spectrum (resulting from the frequency multiplex) with the authorised power frequency pattern.

The different configurations are tested and validated or not according to whether they adhere to a required pattern. In particular, it is possible to adapt to different, collocated, etc., antenna configurations.

Step 3, Optimisation Using a Cost Function

One way to proceed is to resolve the problem by considering a $$\varsigma = \frac{\text{rate}}{\text{power}}$$

cost function in order to determine a good frequency configuration.

In practice, considering the frequencies of the set the costs $$\varsigma_i^j = \frac{d^j - d^{j-1}}{P_i^j - P_i^{j-1}}$$

are defined and arranged, for example the different increments are arranged in ascending order.

The lowest increments are then added together to obtain the solution to the problem concerned (cf. criterion indicated in step 2-E). At each step, the possible specific constraints are checked (cf. step 2-F) by modifying as necessary the cost of a configuration no longer allowing adherence to these constraints (transition to cost>maximum).

It is possible to speed up the process, for example by starting with all the increments and removing the highest from them in order to obtain the solution to a maximum rate problem.

In all cases, it may be necessary to recalculate the cost by setting it at a maximum value if a frequency does not allow adherence to the additional constraints of 2-F.

Some example embodiments of the method will be given as illustrative and non-limiting.

By considering an example of frequencies $S = \{f_1^\circ, \ldots, f_{10}^\circ\}$ which, after filtering on the service and passing frequency conditions, yields the set $S''' = \{f_1, f_2, f_3\}$.

Analysis of the band concerned and the quality information enabling the following allocation:

$f_1$: 1 W=>3200 b/s; 3.5 W=>4800 b/s, the other rates not being permitted for $f_1$ at $P_{max}$ 5 W $f_2$: 2 W=>3200 b/s; 4.5 W=>4800 b/s; 8.5 W=>6400 b/s, the other rates not being permitted for $f_2$ at $P_{max}$ 10 W $f_3$: 3 W=>3200 b/s; 6 W=>4800 b/s; 10 W=>6400 b/s, 20 W=>9600 b/s, all of these rates being ok in relation to $P_{max}$ 400 W for $f_3$ $\varsigma_1^1 = 3200/1 = 3200$ $\varsigma_1^2 = 1600/2.5 = 640$ $\varsigma_2^1 = 3200/2 = 1600$ $\varsigma_2^2 = 1600/2.5 = 640$ $\varsigma_2^3 = 1600/4 = 400$ $\varsigma_3^1 = 3200/3 = 1067$ $\varsigma_3^2 = 1600/3 = 533$ $\zeta_3^3 = 1600/4 = 400$ $\zeta_3^4 = 3200/10 = 320$ Thus producing: $\zeta_1^1 \geq \zeta_2^1 \geq \zeta_3^1 \geq \zeta_1^2 \geq \zeta_2^2 \geq \zeta_3^2 \geq \zeta_2^3 \geq \geq \zeta_3^3 \geq \zeta_3^4$ A rate D of 10 kb/s will therefore be attained at a minimum power by using the three frequencies $f_1$, $f_2$ and $f_3$ with $f_1$ at 4800 b/s, $f_2$ at 3200 b/s and $f_3$ at 3200 b/s.

If a check on the resulting pattern revealed non-adherence to the constraints, for example due to the excessively large spacing of $f_2$ in relation to the other frequencies, $f_2$ would be eliminated from the choices, its costs maximised and the required rate D of 10 kb/s would then be obtained with $f_1$ at 4800 b/s and $f_3$ at 6400 b/s.

This type of optimisation problem under constraints is handled particularly well with the class of separation and evaluation algorithms known as "branch and bound". This principle combines a recursive method of enumeration of the combinations with an evaluation of partial solutions (partially allocated variables) which avoids exhaustive exploration of the combinations. For example, if the maximum power criterion is not verified for a set of two channels, it is unnecessary to explore all the other sets including these channels.

The method according to the invention notably determines a frequency usage solution adhering to the allocations carried out, and in particular limitations that may be linked to the type of service concerned, to a frequency usage type and to radio constraints of the pattern and co-location transmission type. The method enables management of the channel assignment to narrowband transmissions or to broadband transmissions, without necessarily having to individualise these channels. In fact, the method authorises a pooling of narrowband channels for these two transmission types. The method notably takes account of the spectral pattern resulting from the multiplex selection and rejects a configuration which might not conform to the standard.

The solution offered by the method according to the invention offers notably the following advantages:

it is compatible with the different standards and criteria that may need to be observed, but also with particular configurations, such as antennas with narrower bandwidth, through simple modification of the filtering rules and/or the cost function, it is compatible with the simultaneous use of existing 2G/3G standards by other radio terminals sharing a common or partially common plan, it determines an optimised transmission configuration according to the required criterion, such as maximum rate, minimal power at a given rate, etc.

Finally, the method can be used unilaterally on the transmitting terminal side by simply supplying the selected frequencies to the receiver.

The invention claimed is:

1. A method for dynamic high-frequency (HF) frequency allocation management in a broadband communication network containing a plurality of users, a set of $N_0$ frequencies $S = \{fi\}_{i=1}$, $N_0$ being allocated to each user, $N_0$ being a positive integer, each frequency in the set S having one or more authorised service level agreements (SLAs) services, a maximum power level $P_{max}$ for each SLA service and an associated usage type, the method comprising the following steps:

determining a sub-set S' formed as an intersection of a range of passing frequencies for a user for a given link in the broadband communication network and SLA service of the set S, establishing a set of eligible frequencies S" in a transmission range of the user with the different power and modulation configurations for said each frequency, the set S" including an intersection between the set S and the range of passing frequencies in the sub-set S', analysing a received spectrum in order to determine the frequency or frequencies already used and deciding, on the basis of an associated usage type of said frequency or frequencies, whether said frequency or frequencies must be excluded in order to form a set S''' of N possible frequencies fl, for each frequency fl of the set S''', determining a necessary power $\tilde{P}_i^j$, $i=1 \ldots N$, $j=1 \ldots m$ with N being a number of frequencies in the set S''', m being one of a plurality of rate/waveform configurations, for each of the m possible rate/waveform configurations, taking into account a power limit on said each frequency fl, allocating the frequencies fl of the set S''' to different users, respective modulation and power of the frequencies fl, by taking account of multi-carrier constraints including a maximum total band, a total power, a conformity of the transmitted spectrum resulting from a simultaneous use of the frequencies fl with an eligible power frequency pattern.

2. The method according to claim 1, wherein, for a user and a particular SLA concerned, the list of the m possible rate/waveform configurations for the particular SLA is determined during an operation of the method.

3. The method according to claim 1, wherein the necessary power $\tilde{P}_i^j$, $i=1 \ldots N$, $j=1 \ldots m$ is determined by applying the following rule:

if $\tilde{P}_i^j > P_{tot}$ then $P_i^j = P_{tot} + 1$ if $\tilde{P}_i^j \leq P_{tot}$ then $P_i^j = \tilde{P}_i^j$ where $P_{tot}$ denotes a total overall transmit power level of a transmitter in the broadband communication network, $i=1, \ldots N$, and $i=1, \ldots m$ with m being the number of the rate/waveform configurations.

4. The method according to claim 1, wherein a rate/power cost function is used to determine the different power and modulation configurations for said each frequency.

5. The method according to claim 1, wherein a cost function $$\varsigma = \frac{rate}{power}$$

and the costs $$\varsigma_i^j = \frac{d^j - d^{j-1}}{P_i^j - P_i^{j-1}}$$

are defined in different increments arranged in ascending order, wherein $d^j$ is the rate for the configuration j, $d^{j-1}$ is a rate for a configuration (j−1), $P_i^j$ is a power for a configuration j and a frequency i of the set S", $P_i^{j-1}$ is a power for the configuration j−1 and the frequency i of the set S".

6. The method according to claim 1, wherein a step of resolution under said allocating is carried out according to a required criterion by using one of the following criteria:

determining a target rate D using a minimum overall power $$\min \sum_{i=1}^{N} \sum_{j=1}^{m} x_i^j P_i^j \Big| \sum_{i=1}^{N} \sum_{j=1}^{m} x_i^j d^j \geq D,$$

where D is a target rate, $d^j$ is a rate for a $j^{th}$ configuration, $P_i^j$ is a power for a configuration j and a frequency i of the set S", $x_i^j$ is an assignment variable, or determining a maximum rate under the constraint of a total overall transmit power level $$P_{tot} \max \sum_{i=1}^{N} \sum_{j=1}^{m} x_i^j d^j \Big| \sum_{i=1}^{N} \sum_{j=1}^{m} x_i^j P_i^j < P_{tot},$$

where n is a maximum number of 3 kHz channels concerned $P_{tot}$ is a total overall transmit power of a transmitter in the broadband communication network.

7. The method according to claim 6, wherein an integrity constraint of a frequency modulation choice of the frequencies is used, represented by the integral variable $x_i^j$:

$$\forall i = 1 \cdots N, j = 1 \cdots m x_i^j \in \mathbb{N}$$

$$\forall i = 1 \cdots N, \sum_{j=1}^{m} x_i^j \leq 1$$

$$\sum_{i=1}^{N} \sum_{j=1}^{m} x_i^j \leq n.$$

a set of $x_i^j$ values (i=1 to N, j=1 to m) satisfying the following integrity constraints, where $x_i^j$ is an assignment variable, with i=1 to N, j=1 to m, m being a number of the rate/waveform configurations.

8. The method according to claim 7, wherein the integral variable has the value 1 when the frequency $f_i$ is used with the rate $d^j$ of the $j^{th}$ configuration.

9. The method according to one claim 1, wherein said steps are carried out for fourth-generation or 4G high-frequency transmissions.

10. A system for dynamic high frequency (HF) frequency allocation management in a broadband communication network including a plurality of users, a set of $N_0$ frequencies $S=\{fi\}_{i=1, N0}$ being allocated to each user, $N_0$ being a positive integer, each frequency in the set S having one or more authorised service level agreements (SLAs), a maximum power level $P_{max}$ for each SLA in the one or more authorized SLAs and an associated usage type, each user comprises a frequency plan storage memory for the SLA and at least a processor adapted for carrying out:

determining a sub-set S' formed as an intersection of a range of passing frequencies for a user for a given link in the broadband communication network and SLA service of the set S, establishing a set of eligible frequencies S" in a transmission range of the user with the different power and modulation configurations for said each frequency, the set S" including an intersection between the set S and the range of passing frequencies in the sub-set S', analysing a received spectrum in order to determine the frequency or frequencies already used and deciding, on the basis of an associated usage type of said frequency or frequencies, whether said frequency or frequencies must be excluded in order to form a set S'" of N possible frequencies fl, for each frequency fl of the set S'", determining a necessary power $\tilde{P}_i^j$, i=1 ... N, j=1 ... m with N being a number of frequencies in the set S'", m being one of a plurality of rate/waveform configurations, for each of the m possible rate/waveform configurations, taking into account a power limit on said each frequency fl, allocating the frequencies fl of the set S'" to different users, respective modulation and power of the frequencies fl, by taking account of multi-carrier constraints including a maximum total band, a total power, a conformity of the transmitted spectrum resulting from a simultaneous use of the frequencies fl with an eligible power frequency pattern.

11. The system according to one claim 10, wherein said system is implemented for fourth-generation or 4G high-frequency transmissions.

* * * * *